(12) United States Patent
Hong et al.

(10) Patent No.: US 8,338,026 B2
(45) Date of Patent: Dec. 25, 2012

(54) POSITIVE ELECTRODE ACTIVE MATERIAL, AND POSITIVE ELECTRODE AND LITHIUM SECONDARY BATTERY INCLUDING THE SAME

(75) Inventors: Seung-Taek Hong, Seoul (KR); Hey Woong Park, Daejeon (KR); Ho Jin Jeon, Daejeon (KR); Sung Joon Park, Seoul (KR); Dae Sik Choi, Yongin (KR); Nan Ji Yun, Daejeon (KR); Yo Jin Kim, Daejeon (KR); Seung Don Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/322,487

(22) PCT Filed: May 27, 2010

(86) PCT No.: PCT/KR2010/003367
§ 371 (c)(1),
(2), (4) Date: Feb. 21, 2012

(87) PCT Pub. No.: WO2010/137889
PCT Pub. Date: Dec. 2, 2010

(65) Prior Publication Data
US 2012/0156560 A1   Jun. 21, 2012

(30) Foreign Application Priority Data

May 27, 2009 (KR) .................. 10-2009-0046311
Jun. 8, 2009 (KR) .................. 10-2009-0050404

(51) Int. Cl.
*H01M 4/64* (2006.01)
*H01M 4/62* (2006.01)
*H01M 4/66* (2006.01)

(52) U.S. Cl. ............................ 429/211; 252/182.1

(58) Field of Classification Search .................. 429/211
See application file for complete search history.

(56) References Cited

U.S. PATENT DOCUMENTS

| | | | |
|---|---|---|---|
| 2003/0027050 A1 | 2/2003 | Okamoto et al. | |
| 2004/0191631 A1 | 9/2004 | Fukui et al. | |
| 2006/0257745 A1* | 11/2006 | Choi et al. ............... | 429/231.3 |
| 2009/0148772 A1 | 6/2009 | Kawasato et al. | |

FOREIGN PATENT DOCUMENTS

| | | |
|---|---|---|
| JP | 2003-7305 A | 1/2003 |
| KR | 10-2004-0086590 A | 10/2004 |
| KR | 10-2004-0096381 A | 11/2004 |
| KR | 10-2006-0091486 A | 8/2006 |
| KR | 10-2006-0095957 A | 9/2006 |
| KR | 10-2009-0045152 A | 5/2009 |

OTHER PUBLICATIONS

International Search Report issued in PCT/KR2010/003367 dated Jan. 31, 2011.

* cited by examiner

*Primary Examiner* — Patrick Ryan
*Assistant Examiner* — Brent Thomas
(74) *Attorney, Agent, or Firm* — Birch, Stewart, Kolasch & Birch, LLP

(57) ABSTRACT

Provided is a positive electrode active material. The positive electrode active material includes: a small-diameter active material having an average particle diameter of about 0.5 μm and a maximum particle diameter of less than about 1 μm; and a large-diameter active material having an average particle diameter of about 5 μm to about 20 μm and a maximum particle diameter of less than about 100 μm.

19 Claims, 1 Drawing Sheet

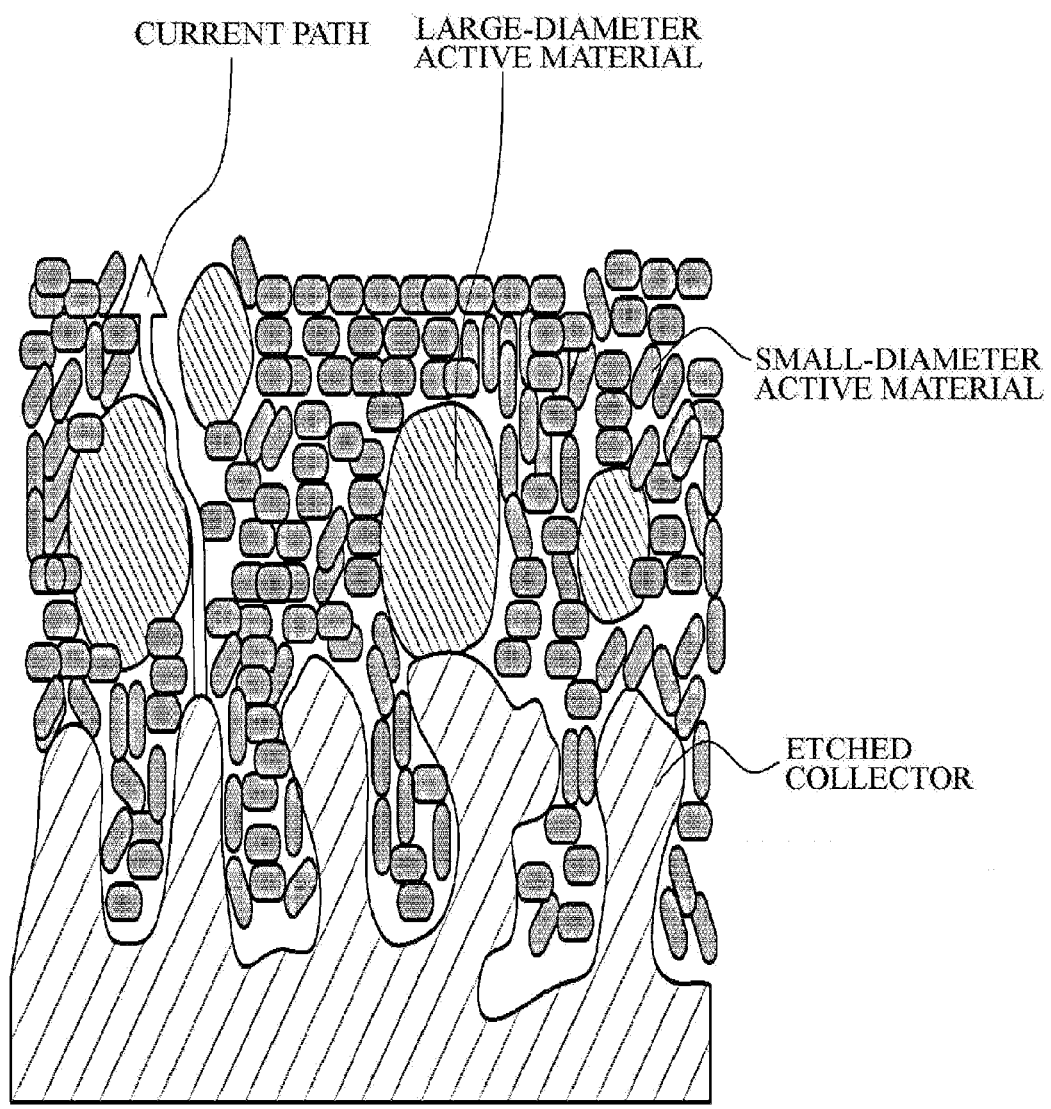

POSITIVE ELECTRODE ACTIVE MATERIAL, AND POSITIVE ELECTRODE AND LITHIUM SECONDARY BATTERY INCLUDING THE SAME

CROSS-REFERENCE TO RELATED APPLICATIONS

This application is a 35 U.S.C. §371 National Stage entry of International Application No. PCT/KR2010/003367, filed on May 27, 2010, and claims priority to Korean Application Nos. 10-2009-0046311, filed on May 27, 2009, and 10-2009-0050404, filed on Jun. 8, 2009, which are hereby incorporated by reference in their entirety into this application.

BACKGROUND OF THE INVENTION

The present invention disclosed herein relates to a positive electrode active material, and a positive electrode and lithium secondary battery including the same, and more particularly, to a positive electrode active material employing active materials with excellent thermal stability, which have two different types and particle sizes to obtain high volumetric density and thus improve stability, and a positive electrode and lithium secondary battery including the same.

A lithium secondary battery has higher voltage and capacity than a typical nickel cadmium secondary battery. Especially, when a typical lithium transition metal such as $LiCoO_2$, $LiNiO_2$, or $LiMn_2O_4$ is used as a positive electrode active material, and graphite or carbon such as carbon fiber is used as a negative electrode active material, a high voltage of more than about 4 V may be generated and concerns about side effects such as electrical short may become less. Therefore, their availabilities as a portable power of a mobile electronic device such as a mobile phone, a notebook PC, and a digital camera are high.

As mobile devices have been continuously lighter and more compact with high performance and various functions and also required to operate under high or low temperature environments, characteristics such as high-level electric capacity, electric discharge/charge, and safety are essential.

Accordingly, a typical lithium battery simply using a $LiCoO_2$ powder of a predetermined form as a positive electrode active material may not provide the above-mentioned battery characteristics. To satisfy the above battery characteristics, various kinds of typical techniques are introduced.

For example, a technique for coating positive electrode active material particles is suggested. However, this technique has difficulty in actual application due to complex manufacturing processes.

As another technique, a technique for improving the packing density of active material particles is suggested. A related art about the above techniques may be disclosed in patent documents below.

Japan patent publication No. 2000-082466 discloses that a lithium cobalt complex oxide has an average particle diameter of about 0.1 μm to about 50 μm and a positive electrode active material has two peaks in a particle distribution.

Korean patent publication No. 2002-0057825 discloses positive electrode active materials mixed with a positive electrode active material having an average particle diameter of about 7 μm to about 25 μm and a positive electrode active material having an average particle diameter of about 2 μm to about 6 μm.

Japan patent publication No. 2004-119218 discloses positive electrode active materials mixed with a positive electrode active material having an average particle diameter of about 7 μm to about 20 m and a positive electrode active material having an average particle diameter, which is about 10% to about 30% of the former.

SUMMARY OF THE INVENTION

The above typical techniques mix two different kinds of positive electrode active materials or use positive active materials having the at least two maximum values of an average particle diameter. Due to this, the positive electrode active materials are densely packed, thereby improving battery capacity.

Moreover, when two active materials having respectively different particle diameters are used, contact resistance between the two active materials may be increased. Additionally, when an active material having a particle diameter of less than about 1 μm is used, contact resistance between the active materials may be greatly increased.

Furthermore, when an active material and a collector are rolled to manufacture an electrode, roll press may not be uniformly applied due to the particle diameters of the mixed active materials.

Therefore, it is required that more than two kinds of positive electrode active materials should be properly mixed and packed, in order to improve volumetric density.

Moreover, it is still demanded that a complex positive electrode active material for a lithium battery having improved properties such as high voltage stability, thermal stability, and high-rate discharge should be obtained. Especially, a positive electrode active material having excellent thermal stability has poor electrical conductivity, so that it may deteriorate an overall performance of a battery. As a result, the positive electrode active material is not commonly used for manufacturing a battery.

Accordingly, the present invention provides a positive electrode material, which adopts a material having excellent thermal stability, resolving a large contact resistance between active materials by mixing two active materials having different particle diameters with an optimal ratio, and has excellent packing density and output density by minimizing power distribution during roll press for processing a positive electrode.

Embodiments of the present invention provide positive electrode active materials including: a small-diameter active material having an average particle diameter of about 0.5 μm and a maximum particle diameter of less than about 1 μm; and a large-diameter active material having an average particle diameter of about 5 μm to about 20 μm and a maximum particle diameter of less than about 100 μm.

In some embodiments, the small-diameter active material may have an olivine structure of lithium metal phosphate ($LiMPO_4$).

In other embodiments, the small-diameter active material may be lithium iron phosphate ($LiFePO_4$).

In still other embodiments, the small-diameter active material may have an olivine structure of carbon-coated $LiMPO_4$.

In even other embodiments, a weight ratio of the small-diameter active material and the large-diameter active material may be 7+x:3−x (only when $0 \leq x < 3$).

In yet other embodiments, the weight ratio of the small-diameter active material and the large-diameter active material may be =9:1.

In further embodiments, the large-diameter active material may include at least one selected from the group consisting of lithium manganese oxide, lithium cobalt oxide, lithium nickel oxide, lithium manganese cobalt oxide, lithium manganese nickel oxide, lithium cobalt nickel oxide, and lithium manganese cobalt nickel oxide.

In other embodiments of the present invention, positive electrodes include: the positive electrode active material; a conductive material; and a collector.

In some embodiments, the collector may have an uneven structure on a surface thereof.

In other embodiments, the uneven structure may be formed through etching.

In still other embodiments, an etched depth of the collector may be less than ⅓ of a total thickness of the collector.

In even other embodiments, an average surface roughness (Ra) of the surface of the collector having the uneven structure may be more than or equal to about 0.02 μm.

In yet other embodiments, the collector may have a capacity of less than or equal to about 120 μF/cm$^3$.

In further embodiments, the collector may be formed of aluminum.

In still further embodiments, the conductive material may be formed of carbon black or graphite particle.

In even further embodiments, the positive electrode may further include a binding material.

In yet further embodiments, a thickness of the positive electrode may be about 150 μm to about 170 μm.

In still other embodiments of the present invention, lithium secondary batteries include the positive electrode.

In some embodiments, an output density of the lithium ion battery may be more than or equal to about 1000 W/Kg.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 1 is a sectional view of a positive electrode according to an embodiment.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, the present invention will be described in detail.

The present invention features a positive electrode active material including different small- and large-diameter active materials. The small-diameter active material has an average particle diameter of about 0.5 μm and the maximum particle diameter of less than about 1 μm. The large-diameter active material has an average particle diameter of about 0.5 μm to about 20 μm and the maximum particle diameter of less than about 100 μm.

One of methods to improve the electric capacity of a positive electrode for a lithium battery is to optimize the distribution of a single kind or different kinds of powder. That is, when a single kind of powder is packed, since predetermined gaps are formed between particles, other particles having a smaller size than the particles are filled between the gaps. Accordingly, for denser packing, particles of two different kinds are used to fill empty space between large-diameter particles with small-diameter particles. In this case, a size ratio between the large- and small-diameter particles becomes important.

In this present invention, a small-diameter active material having an average particle diameter of about 0.5 μm and the maximum particle diameter of about 1 μm and a large-diameter active material having an average diameter of about 5 μm to about 20 μm and the maximum diameter of about 100 μm are mixed and used. When the small-diameter and large-diameter active materials are mixed with the particle diameter ratio, packing density and output density are all improved and the thickness of a positive electrode is also reduced.

According to the present invention, a weight ratio of a small-diameter active material and a large-diameter active material may be a small-diameter active material: a large-diameter active material=7+x:3−x (only when 0≦x<3). More preferably, in relation to the active material, a weight ratio of a small-diameter active material and a large-diameter active material may be a small-diameter active material: a large-diameter active material=9:1. As shown in an embodiment of the present invention, if the active materials are configured with the above ratio, the thickness of a positive electrode may be reduced and an output density may be raised to a level of more than about 1000 W/Kg.

According to the present invention, the small-diameter active material may be an active material having an olivine structure of lithium metal phosphate. In more detail, the lithium metal phosphate may have a structure of LiMPO4 (here, M=Co, Ni, Fe, Cr, Zn, Cu or Ta) and more preferably may have a structure of LiFePO4.

Compared to other positive electrode active materials, the lithium iron phosphate has excellent thermal stability so that it may improve the stability of a lithium secondary battery. However, since the lithium iron phosphate has low electrical conductivity, output and rate characteristics may be deteriorated. To resolve this, the particle diameter of an active material may be manufactured to be small. However, in the case of the lithium iron phosphate active material, since it is difficult to effectively reduce the thickness of an electrode due to power dispersion effects of small particles during electrode press, a large-diameter active material is added to compensate and correct the above issue in order to increase electrode density. For example, according to the present invention, a positive electrode may be formed with a thin thickness of about 150 μm to about 170 μm. Moreover, when carbon-coated olivine is applied, adhesiveness for a collector of an active material is more improved.

According to the present invention, the large-diameter active material may use at least one selected from the group consisting of lithium manganese oxide, lithium cobalt oxide, lithium nickel oxide, lithium manganese cobalt oxide, lithium manganese nickel oxide, lithium cobalt nickel oxide, and lithium manganese cobalt nickel oxide.

Moreover, the present invention relates to a positive electrode including a) a positive electrode active material; b) a conductive material; and c) a collector. The present invention may further include d) a binding material.

The positive electrode of the present invention may use the above-mentioned electrode active material and may be manufactured through a typical positive electrode manufacturing method. For example, a material including the active material, conductive material, and binding material may be molded with a predetermined form or may be applied on a collector such as aluminum foil or mesh to form the positive electrode. In more detail, a positive electrode material composition (typically including a positive electrode active material, a conductive material, and a binding material) is manufactured and then is directly applied on an aluminum foil or mesh collector. Or, the positive material composition is casted on an additional supporter, and then, a positive electrode active material film delaminated from the supporter is laminated on an aluminum foil or mesh collector to obtain the positive electrode. The positive electrode of the present invention is not limited to the above listed form and varies as necessary.

A battery for high capacity is required to charge/discharge a large amount of current, and for this, a material for low electric resistance of an electrode is necessary. Accordingly, in order to reduce the resistance of an electrode, various conductive materials are typically added. The general conductive materials include carbon blacks and graphite particles.

In the positive electrode of the present invention, the collector may use any general collector without limitation. However, an uneven structure may be formed on the surface of the collector through an etching method in aspects of the active material packing or adhesiveness between the collector and the active material. In this case, a binding power between the collector and the active material is securely obtained even under severe conditions, thereby improving storage capacity at high temperature and cycle performance. Additionally, obtaining a current path between the active material and the collector becomes easy so that output is increased (in the case of olivine, about 30%) and energy density is improved (about 6% to about 7%). Especially, the uneven structure on the surface of the collector may be effective when loading is less.

Additionally, as a material for the collector having the uneven structure, aluminum (Al) may be used. In order to maximize the adhesiveness improvement, the degree of forming the uneven structure is adjusted to allow the average surface roughness Ra of the surface of the collector having the uneven structure to be more than or equal to about 0.02 μm.

Furthermore, the depth of an etched region may be less than or equal to about ⅓ of the total thickness of the collector. If the depth of the etched region is greater than about ⅓ of the total thickness of the collector, the mechanical strength of the collector becomes weaker so that the collector may be broken during a lithium secondary battery manufacturing process.

Referring to FIG. 1, when small-diameter and large-diameter active materials having mutually different average particle diameters are applied on the surface-etched collector according to the present invention, it is understood that a current (ions) path may be effectively formed.

The collector may have a thickness about 3 μm to about 500 μm.

Additionally, the collector may have a capacity of less than about 120 μF/cm$^3$. Since the surface of the etched collector is increased due to the unevenness, the degree of etching the collector may be represented using a capacity per unit area. If the etching degree is greater than the range, the mechanical strength of the collector becomes weaker so that the collector may be broken during a lithium secondary battery manufacturing process.

Etching, one of methods of forming an uneven structure on the surface of a collector, may include a chemical etching method or an electrochemical etching method.

The chemical etching method for etching the collector may use acid solution or alkali solution. The acid solution used for the chemical etching method may include hydrochloric acid, sulfuric acid, and ferric chloride. Additionally, the alkali solution used for the chemical etching method may include a solution containing sodium hydroxide. However, the solution used for the chemical etching method is not limited to the above and thus may include various solutions for corroding aluminum.

The chemical etching method for aluminum includes a pretreatment process and an etching process. The pretreatment process is a process for performing an alkali treatment on an aluminum thin film by using an alkali solution containing NaOH to remove an oil element and an oxide film remaining on the surface of the collector.

The etching process is a process for depositing an aluminum thin film in an acid solution or an alkali solution to form unevenness on the surface of the aluminum thin film. As mentioned above, the acid solution used for this time may include hydrochloric acid, sulfuric acid, and ferric chloride. Additionally, the acid solution is used for maintaining an appropriate concentration and a higher temperature than a room temperature to effectively process an etching process. For example, when hydrochloric acid is used as the acid solution, a concentration of the hydrochloric acid is adjusted to about 0.8 M to about 2.0 M and a temperature is maintained in a range of about 35° C. to about 45° C., in order to perform an etching process.

A method of forming an etching region in the collector includes an electrochemical etching method besides the chemical etching method. An electrochemical etching method provides current to an aluminum metal to perform an etching process faster than the chemical etching method. At this point, DC current or AC current is applied to aluminum metal while the aluminum metal is deposited in an acid solution or an alkali solution. At this point, the applied current may have an appropriate value depending on a necessary etching area and depth. For example, the electrochemical etching method uses a current having a current density of several mA/cm$^2$ to several hundred mA/cm$^2$. Additionally, when AC current is used, a current having an appropriate AC frequency range is supplied.

It is apparent that a method of etching the collector may typically include a method of etching aluminum metal besides the above method.

Additionally, it is characterized that a lithium secondary battery of the present invention may include the above positive electrode. A lithium secondary battery of the present invention may be manufactured as follows.

First, a positive electrode in a battery of the present invention may be manufactured and prepared as described above.

In the case of a negative electrode, a negative electrode active material composition is prepared by mixing a negative electrode active material, a conductive material, a binding material, and a solvent. The negative electrode active material composition directly coats a metal collector and is dried, to prepare a negative electrode. Also, after the negative active material composition is casted on an additional supporter, a film obtained from delaminating the supporter may be laminated on a metal supporter to manufacture a negative electrode.

The negative electrode active material may include lithium metal, lithium alloy, carbon material, oxide mainly containing metals of groups 14 and 15 on the periodic table, carbon compound, carbon silicon compound, oxide silicon compound, titanium sulfide, boron carbide compound, and carbon metal compound. The carbon material may include results obtained through thermal decomposition of organic matter under various thermal conditions, artificial graphite, natural graphite, soil graphite, expansion graphite, and scale-shaped graphite.

The conductive material may include carbon black. The binding material may include vinylidene fluoride/Hexafluoropropylene copolymer, polyvinylidene fluoride, poly(acrylonitrile), polymethyl methacrylate, polytetrafluorethylene, carboxymethyl cellulose, mixtures thereof, and styrene butadiene rubber based polymer. The solvent may include N-methyl pyrrolidon, acetone, and water. At this point, if the contents of the negative electrode active material, conductive material, binding material, and solvent are in a level used for a general lithium battery manufacturing process, they are appropriate.

A separator is disposed between the positive electrode and the negative electrode to form a battery structure. Such a battery structure is winded or folded and is put in a cylindrical battery case or a polygonal battery case. Then, an organic electrolyte solution is injected therein to complete a lithium ion battery.

Additionally, the battery structure is stacked in a bi-cell structure and then is impregnated in an organic electrolyte solution. The result obtained is put in a pouch and sealed to complete a lithium ion polymer battery.

All kinds of the separator used in a typical lithium battery may be possible. Especially, the separator may have low resistance to ion transfer and excellent electrolyte solution moisturizing ability. If this will be described in more detail, the separator may include glass fiber, polyester, Teflon, polyethylene, polypropylene, polytetrafluoroethylene (PTFE), and mixtures thereof, and may have a nonwoven or woven form. If this will be described in more detail, in the case of a lithium ion battery, a windable separator formed of polyethylene or polypropylene is used. In the case of a lithium ion polymer battery, a separator having excellent organic electrolyte solution moisturizing ability is used. The separators may be manufactured according to a method below.

That is, after a separator composition is prepared by mixing polymer resin, packing material, and solvent, it directly coats the top side of a positive electrode and is dried to form a separator film. Or, after the separator composition is casted on a supporter and is dried, a separator film delaminated from the supporter is laminated on the top side of a positive electrode. That is, the separator may be formed.

The polymer resin is not especially limited to a specific material and thus, may include all materials used for a binding material of a positive electrode plate. For example, the polymer resin may include vinylidene fluoride/hexafluoropropylene copolymer, polyvinylidene fluoride, poly(acrylonitrile), polymethyl methacrylate, and mixtures thereof.

An electrolyte includes a solution (such as propylene carbonate, ethylene carbonate, diethyl carbonate, ethylmethyl carbonate, methylpropyl carbonate, butylene carbonate, benzonitrile, acetonitrile, tetrahydrofuran, 2-methyltetrahydrofuran, butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethyl carbonate, methylethyl carbonate, diethyl carnonate, methylpropyl carbonate, methylisopropyl carbonate, ethylpropyl carbonate, dipropyl carbonate, dibutyl carbonate, diethylene glycol or dimethylether and a mixed solution thereof) and lithium salt (such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$(only when x and y are natural numbers), LiCl, and LiI). At least one electrolyte is mixed and dissolved to prepare an electrolyte solution.

Hereinafter, the present invention will be described in more detail with reference to embodiments and comparative examples below. However, the embodiments below are just exemplary and do not limit the scope of the present invention.

EXAMPLE

Example 1

As a positive electrode active material, a 0.2 g $LiMn_{0.1}Co_{0.1}Ni_{0.8}O_2$ powder having an average particle diameter of about 11 μm (the maximum particle diameter of less than about 100 μm) and a 1.8 g $LiFePO_4$ powder having an average particle diameter of about 0.5 μm (the maximum particle diameter of less than about 1 μm) were used. A 0.6 g acetylene black powder having an average diameter of about 6 μm as a conductive material and a 0.045 g polyvinylidene fluoride (PVdF) as a binding material were mixed, and then 5 mL N-methyl-pyrrolidone was put therein. Then, a mechanical agitator was used for about 30 min to manufacture slurry.

This slurry coated an aluminum collector with a thickness of about 200 μm by using a doctor blade and then was dried. After that, the result obtained was dried again under conditions such as vacuum and 110° C. to manufacture a positive electrode. Finally, the positive electrode was rolled in a sheet shape through roll press to manufacture the final one.

Example 2

Except the fact that a 0.6 g $LiMn_{0.1}Co_{0.1}Ni_{0.8}O_2$ powder having an average particle diameter of about 11 μm (the maximum particle diameter of less than about 100 μm) and a 1.4 g $LiFePO_4$ powder having an average particle diameter of about 0.5 μm (the maximum particle diameter of less than about 1 μm) were used as a positive electrode active material, a positive electrode of the example 2 was manufactured identical to that of the example 1.

Example 3

Except the fact that a 1 g $LiMn_{0.1}Co_{0.1}Ni_{0.8}O_2$ powder having an average particle diameter of about 11 μm (the maximum particle diameter of less than about 100 μm) and a 1 g $LiFePO_4$ powder having an average particle diameter of about 0.5 μm (the maximum particle diameter of less than about 1 μm) were used as a positive electrode active material, a positive electrode of the example 3 was manufactured identical to that of the example 1.

Example 4

Except the fact that a 1.4 g $LiMn_{0.1}Co_{0.1}Ni_{0.8}O_2$ powder having an average particle diameter of about 11 μm (the maximum particle diameter of less than about 100 μm) and a 0.6 g $LiFePO_4$ powder having an average particle diameter of about 0.5 μm (the maximum particle diameter of less than about 1 μm) were used as a positive electrode active material, a positive electrode of the example 4 was manufactured identical to that of the example 1.

Example 5

Except the fact that an electrochemically-etched aluminum collector was used, a positive electrode of the example 5 was manufactured identical to that of the example 1. At this point, a capacity per unit area in the collector was about 108 μF/cm².

Comparative Example 1

Except the fact that a 2 g $LiFePO_4$ powder having an average particle diameter of about 0.5 μm (the maximum particle diameter of less than about 1 μm) was exclusively used as a positive electrode active material, a positive electrode of the comparative example 1 is manufactured identical to that of the example 1.

Comparative Example 2

Except the fact that a 2 g $LiMn_{0.1}Co_{0.1}Ni_{0.8}O_2$ powder having an average particle diameter of about 11 μm (the maximum particle diameter of less than about 100 μm) was exclusively used as a positive electrode active material, a positive electrode of the comparative example 2 is manufactured identical to that of the example 1.

Material properties of the examples and comparative examples were measured and their results are shown in Table 1 below.

TABLE 1

| | Weight ratio of small-diameter active material to large-diameter active material | Packing density (g/cm³) | Positive electrode thickness(μm) | Output density (W/Kg) |
|---|---|---|---|---|
| Example 1 | 9:1 | 0.1047 | 163 | 1800 |
| Example 2 | 7:3 | 0.1089 | 160 | 1600 |
| Example 3 | 5:5 | 0.1176 | 155 | 1500 |
| Example 4 | 3:7 | 0.1184 | 153 | 1400 |
| Example 5 | 9:1 (etching O) | 0.1047 | 163 | 1900 |
| Comparison example 1 | 10:0 | 0.0864 | 181 | 1500 |
| Comparison example 2 | 0:10 | 0.1190 | 150 | 900 |

As shown in Table 1, when a small-diameter active material and a large-diameter active material are mixed with a specific particle diameter ratio according to the examples, packing density and output density may be excellent and the thickness of a positive electrode may be reduced to an appropriate level. Especially, when a collector is etch-processed, adhesiveness between the collector and an active material is improved and an output density is also further increased.

Additionally, if a weight ratio of the large-diameter active material is increased, packing density is generally increased. However, even if the packing density is increased, a contact resistance between active materials is increased. As a result, there is no improvement in the output density. A weight ratio of a small diameter active material to a large-diameter active material may be 7+x:3−x (only when 0≦x<3).

According to examples, a complex positive electrode active material includes a large-diameter positive electrode active material and a small-diameter positive electrode active material. The large- and small-diameter positive electrode active materials are mixed with a predetermined particle diameter ratio and weight ratio, to improve packing density. Highly stable and highly conductive materials are added to have improved volumetric density, discharge capacity, thermal stability, and high-rate discharge characteristics than a typical positive electrode active material.

Additionally, when a positive electrode active material is applied on a collector having an uneven structure on the surface thereof, adhesiveness and a current path between the collector and the active material are increased, thereby improving storage capacity at high temperature, energy density, and output.

The above-disclosed subject matter is to be considered illustrative, and not restrictive, and the appended claims are intended to cover all such modifications, enhancements, and other examples, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A positive electrode active material comprising:
   a small-diameter active material having an average particle diameter of about 0.5 μm and a maximum particle diameter of less than about 1 μm; and
   a large-diameter active material having an average particle diameter of about 5 μm to about 20 μm and a maximum particle diameter of less than about 100 μm,
   wherein a weight ratio of the small-diameter active material and the large-diameter active material is 3+x:7−x (only when 0≦x≦6).

2. The positive electrode active material of claim 1, wherein the small-diameter active material has an olivine structure of lithium metal phosphate ($LiMPO_4$).

3. The positive electrode active material of claim 1, wherein the small-diameter active material is lithium iron phosphate ($LiFePO_4$).

4. The positive electrode active material of claim 2, the small-diameter active material has an olivine structure of carbon-coated $LiMPO_4$.

5. The positive electrode active material of claim 1, wherein the weight ratio of the small-diameter active material and the large-diameter active material is 9:1.

6. The positive electrode active material of claim 1, wherein the large-diameter active material comprises at least one selected from the group consisting of lithium manganese oxide, lithium cobalt oxide, lithium nickel oxide, lithium manganese cobalt oxide, lithium manganese nickel oxide, lithium cobalt nickel oxide, and lithium manganese cobalt nickel oxide.

7. A positive electrode comprising:
   the positive electrode active material of claim 1;
   a conductive material; and
   a collector.

8. The positive electrode of claim 7, wherein the collector has an uneven structure on a surface thereof.

9. The positive electrode of claim 8, wherein the uneven structure is formed through etching.

10. The positive electrode of claim 9, wherein an etched depth of the collector is less than or equal to ⅓ of a total thickness of the collector.

11. The positive electrode of claim 8, wherein an average surface roughness (Ra) of the surface of the collector having the uneven structure is more than or equal to about 0.02 μm.

12. The positive electrode of claim 8, wherein the collector has a capacity of less than or equal to about 120 μF/cm³.

13. The positive electrode of claim 8, wherein the collector is formed of aluminum.

14. The positive electrode of claim 7, wherein the conductive material is formed of carbon black or graphite particle.

15. The positive electrode of claim 7, further comprising d) a binding material.

16. The positive electrode of claim 7, wherein a thickness of the positive electrode is about 150 μm to about 170 μm.

17. A lithium secondary battery comprising the positive electrode of claim 7.

18. The lithium secondary battery of claim 17, wherein an output density of the lithium secondary battery is more than or equal to about 1000 W/Kg.

19. The positive electrode active material of claim 2, wherein the small-diameter active material is lithium iron phosphate ($LiFePO_4$).

* * * * *